Nov. 12, 1968         W. W. MOSELEY, JR         3,410,933
         PROCESS AND APPARATUS FOR THE PRODUCTION OF
               UNIFORMLY PLEATED FOAM SHEET MATERIAL
Filed Jan. 27, 1965                              3 Sheets-Sheet 1

INVENTOR

Walter William Moseley, Jr.

BY Walter N. Kirn Jr.

AGENT

Nov. 12, 1968  W. W. MOSELEY, JR  3,410,933
PROCESS AND APPARATUS FOR THE PRODUCTION OF
UNIFORMLY PLEATED FOAM SHEET MATERIAL
Filed Jan. 27, 1965                                3 Sheets-Sheet 2
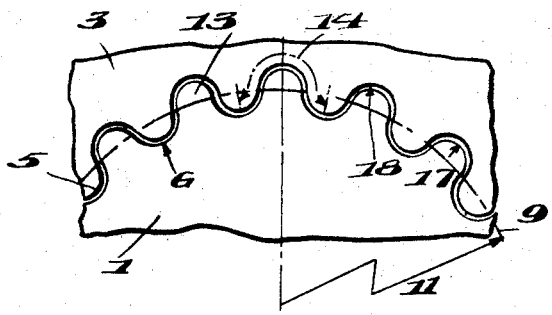
Fig. 3.
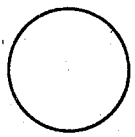
Fig. 4.
Fig. 5.
Fig. 7.
Fig. 8.
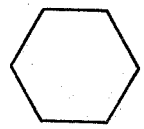
Fig. 9.
Fig. 10.
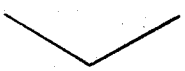
Fig. 11.
Fig. 6.
INVENTOR
Walter William Moseley, Jr.
BY Walter N. Kirn Jr.
AGENT Nov. 12, 1968    W. W. MOSELEY, JR    3,410,933
PROCESS AND APPARATUS FOR THE PRODUCTION OF
UNIFORMLY PLEATED FOAM SHEET MATERIAL
Filed Jan. 27, 1965    3 Sheets-Sheet 3

INVENTOR
Walter William Moseley, Jr.

Walter N. King Jr.
AGENT

United States Patent Office 3,410,933
Patented Nov. 12, 1968

3,410,933
PROCESS AND APPARATUS FOR THE PRODUCTION OF UNIFORMLY PLEATED FOAM SHEET MATERIAL
Walter William Moseley, Jr., Wilmington, Del., assignor to E. I. du Pont de Nemours and Company, Wilmington, Del., a corporation of Delaware
Filed Jan. 27, 1965, Ser. No. 428,440
10 Claims. (Cl. 264—51)

ABSTRACT OF THE DISCLOSURE

Gear die and extrusion process for the preparation of uniformly pleated foam sheets.

This invention relates to the production of foams. More particularly, it relates to the production of uniformly pleated foam sheet material.

The extrusion of foamable compositions through dies having conventional sheet-forming orifices such as circular annuli (endless slots) or simple linear slots frequently produces foam sheets which are wrinkled or pleated. Such extrusion processes are usually characterized by extremely high expansion rates. As a result, folding of the extruded sheet occurs along its width to impart pleats, the "valleys" and "crests" of which are nearly parallel to the direction of extrusion. These pleats may be left in the extruded cellular sheet, or they may be removed. Such a pleated sheet product is described in Belgian Patent No. 625,829.

The tendency for extruded cellular products to become pleated, wrinkled, or corrugated is not restricted to the process of Belgian Patent No. 625,829 but is rather a general phenomenon known and recognized by those skilled in the art. Heretofore, however, no recognition of the utility of pleat formation has been made, and no process for controlling the regularity and uniformity of these pleats is known. When pleat formation has occurred, the prior art has taken steps to remove the pleats by various means.

It is therefore an object of this invention to provide a pleated foam sheet material.

It is another object to provide a uniformly pleated foam sheet material.

These and other objects will become more apparent in the course of the following specification and claims.

In accordance with this invention there is provided in an apparatus for the production of plastic foams which includes a sheet-forming extrusion die and means for supplying a foamable synthetic polymer composition thereto, the improvement wherein the die has an orifice of an essentially constant gap width and which makes undulations about a baseline which has the shape of a conventional sheet-forming orifice, each of the undulations having a maximum displacement from the baseline in excess of the width of the orifice, the peripheral length of each undulation being less than $$\frac{\pi L}{X-1}$$

wherein X is the transverse linear expansion factor of said thermoplastic foam extruded through a conventional sheet-forming orifice and L is equal to the difference between the average transverse dimension of said thermoplastic foam extruded through a conventional sheet-forming orifice and the corresponding dimension of the said conventional sheet-forming orifice.

Figure 1:
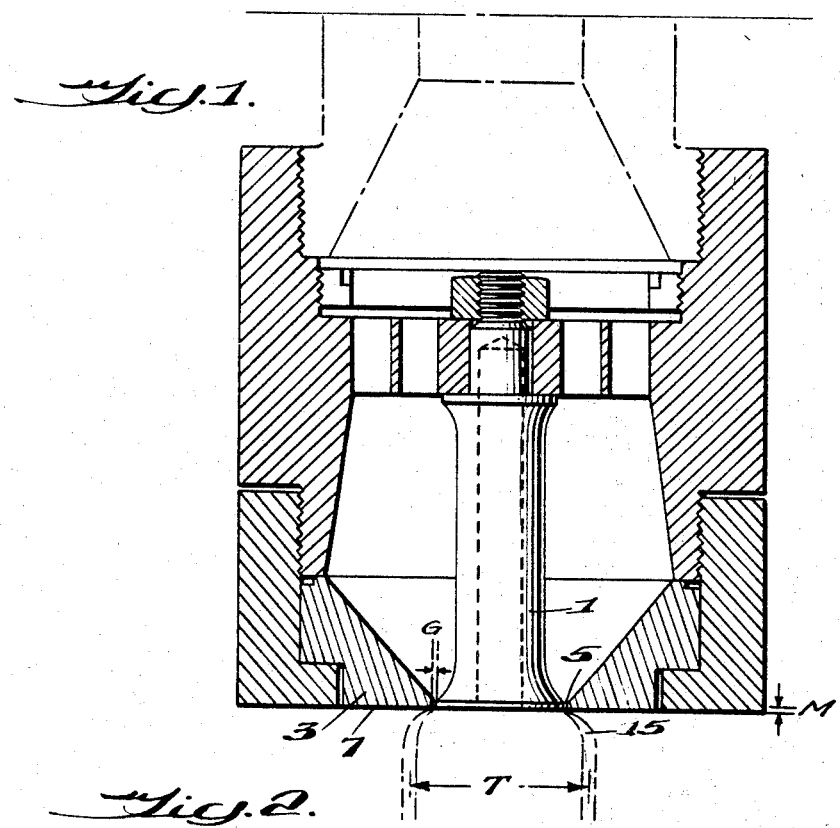
Figure 2:
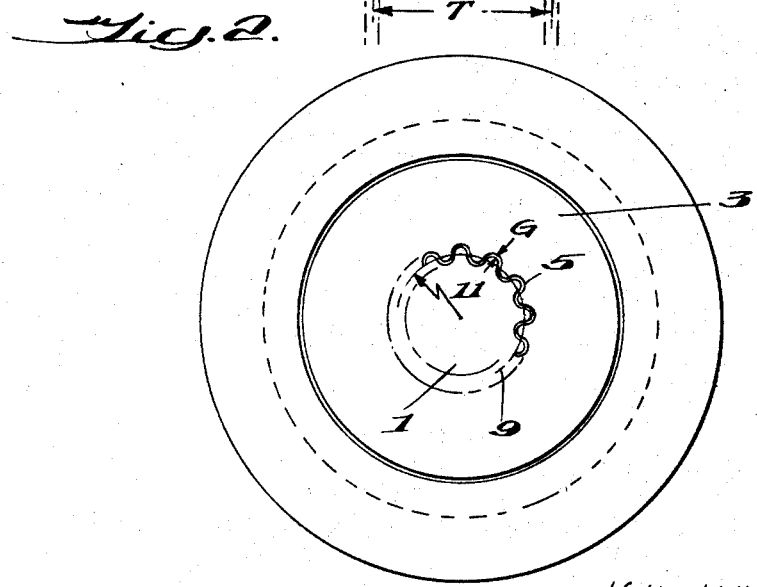
Figure 12:
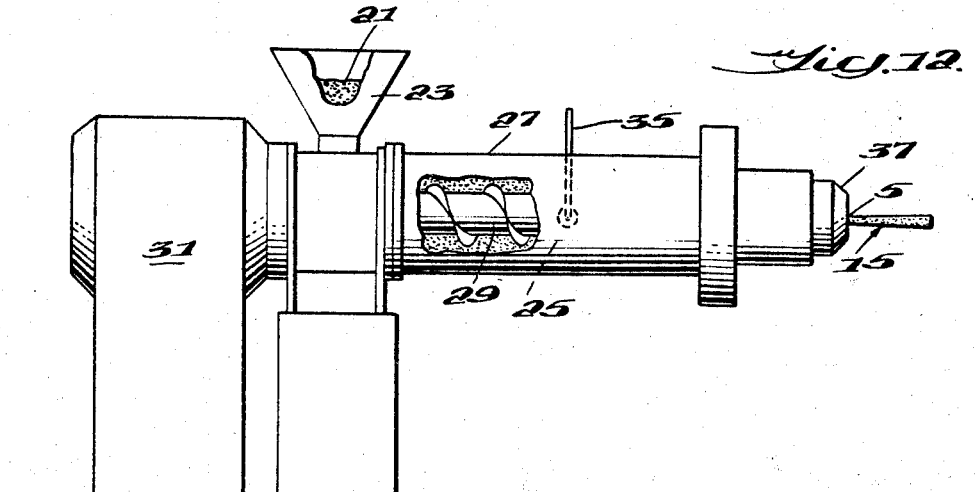
Figure 13:
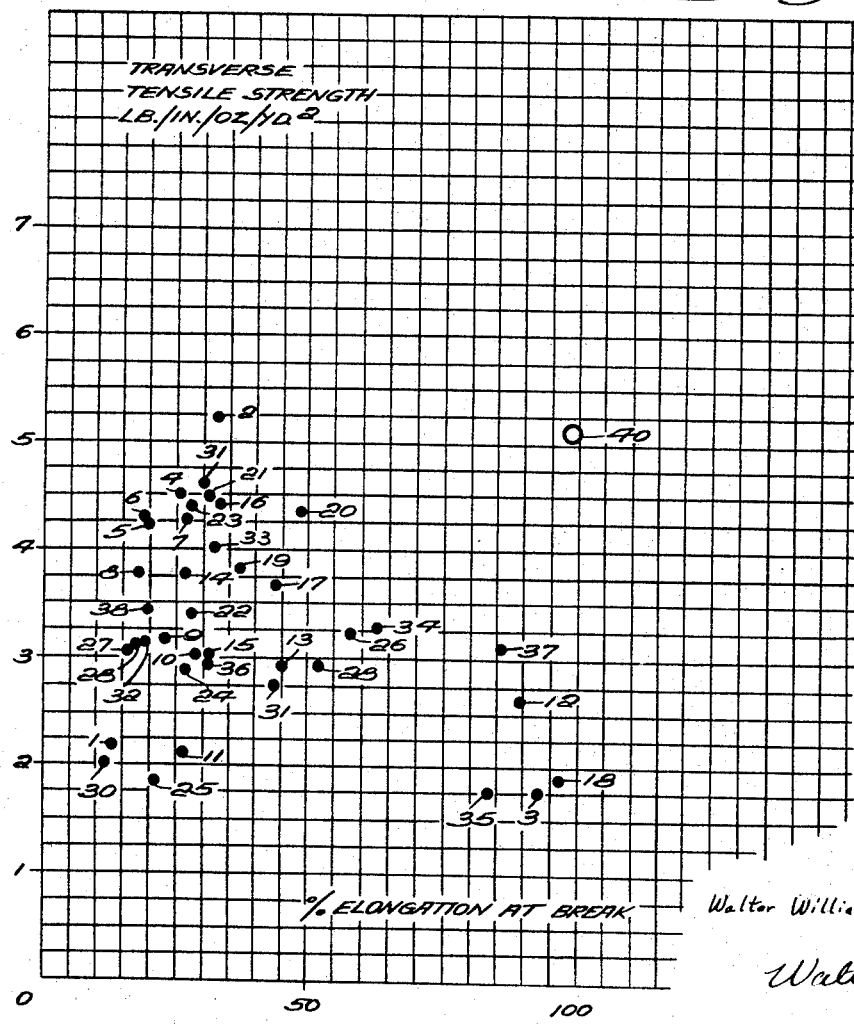

This invention will be more clearly understood by reference to the attached drawings in which:

FIGURE 1 is a cross-section of the discharge end of an extrusion die of this invention;
FIGURE 2 is an end view of the die of FIGURE 1;
FIGURE 3 is an enlarged portion of the die of FIGURE 2;
FIGURES 4–11 illustrate suitable baseline shapes for the die of FIGURE 1;
FIGURE 12 is a conventional extruder to which the die of FIGURE 1 can be adapted; and
FIGURE 13 is a graphical presentation of tensile and elongation data to be read in conjunction with Example I.

Referring now to the drawings, the die, which can be connected by conventional means to an extrusion device such as shown in FIGURE 12, is comprised of an inner die member 1 and an outer die member 3 which together define an orifice 5 at exit surface 7. The orifice 5 has a gap width G, and a land length M.

In operation, the foamable composition at elevated temperature and pressure issues past exit surface 7 into a region of substantially lower (usually atmospheric) pressure, commences expansion instantaneously, and continues until fully expanded while moving away from the exit surface 7.

The foam 15, in its fully expanded state, has an average transverse dimension T, which, in the case of an orifice having a circular baseline, is the average diameter of a tubular structure. The initial expansion of the foam 15 causes an increase in diameter of the extruded tubular sheet which diameter increase is simultaneously restricted both by the momentum of the sheet and by restraints imposed at the extrusion orifice 5. Having reached its average diameter T, corresponding to full expansion, the extruded tubular sheet subsequently experiences only slight variations in its diameter as the stresses due to rapid expansion and pleating are relieved, unless external stretching or compressive forces are applied.

FIGURE 2 is an end view of a portion of the die as seen from exit surface 7. FIGURE 3 shows the significant features of the die of FIGURE 2 in enlargement. The inner die member 1 and outer die member 3 define the endless slot orifice 5 which makes undulations 13 about a baseline 9 which is here defined by the pitch diameter 11. Because of the appearance of the orifice 5, the die is termed a gear die. In the preferred form of the gear die, the undulations 13 are substantially circular in shape so that the gap width G is the difference between the outer radius 18 and the inner radius 17 of the semicircular undulations 13. The peripheral length of an undulation 13 is denoted by the numeral 14.

FIGURE 12 illustrates a typical extruder means for supplying the foamable composition to the die. Referring to FIGURE 12, a thermoplastic resin 21 in the form of cubes or powder, admixed with a nucleating agent if desired, is charged through hopper 23 into the heated extruder barrel 25 of the extruder 27 where the polymer is heated, melted and advanced through the extruder barrel by the extruder screw 29 turned by a power source located at 31. At a point in the extruder barrel 25 where the resin 21 is uniformly molten, foaming agent is injected under pressure by means of a probe into the polymer melt through line 35. The foaming agent becomes uniformly mixed with the polymer as it is pushed towards the extrusion die 37. As the polymer melt emerges from the die orifice 5, the attendant pressure drop allows the foaming agent to expand, thereby forming a foamed sheet 15.

In order to convey a more complete understanding of the invention, the folowing illustrative examples are cited. These examples are not intended, however, to limit in any way the scope of the invention. All parts and percentages are by weight unless otherwise indicated. Melt index is determined according to ASTM Test Method No. D1238–

62T, Condition E, and melt flow by conditional of the same method.

Example 1

A mixture of 1000 gm. of linear polyethylene (melt index of 0.5 measured at 190° C.), 1000 gm. of methylene chloride, and 5 gm. of silica aerogel is placed into an elongated cylindrical, 3-liter pressure vessel. The pressure vessel is sealed and 134 gm. of chlorodifluoromethane is added under pressure. One end of the vessel is fitted with an extrusion gear die of the type illustrated by FIGURES 1 and 2, and the die is sealed by means of a "Teflon" fluorocarbon gasket clamped over the die orifice. The die has a pitch diameter of 2.0 in. (5.08 cm.) and an endless orifice which makes undulations about the baseline in a series of circular shapes characterized by an inner radius of 0.0211 in. (0.0536 cm.) and an outer radius of 0.0311 in. (0.0790 cm.). The gap width is, therefore, 0.010 in. (0.025 cm.) and the land length is 0.062 in. (0.158 cm.). There are a total of 60 complete periodic orifice undulations about the baseline.

The charged pressure vessel is rotated end-over-end for 8 hours in a circulating air bath heated to 150–155° C., and then stopped in an upright position with the gear die facing downward. After leaving the pressure vessel in this position for 5 to 15 minutes, the autogenous pressure is observed to be about 350 p.s.i.g. (24.6 kg./cm.$^2$ gage). A nitrogen ballast pressure of 400 p.s.i.g. (28.1 kg./cm.$^2$ gage) is applied through a valve at the top of the vessel. When the "Teflon" fluorocarbon gasket is removed from the orifice of the gear die, a tubular ultramicrocellular sheet product is extruded at a nominal rate of 500 yd./min. (457.2 meters/min.).

The sheet emerges into a region of atmospheric pressure and ambient temperature. The solidified ultramicrocellular product is tubular in shape and has 60 full pleats (60 pleat "crests" visible from either sheet surface) all parallel and equally spaced across the total width of the opened tube. This highly uniform sheet has a tensile strength along the extrusion direction (direction followed by the pleat crests) of approximately 20 lb./in.//oz./yd.$^2$ (105.4 gm. cm./cm.$^2$//gm./m.$^2$) and a corresponding elongation at break of approximately 200%. Measured in the transverse direction, the tensile strength is about 5.2 lb./in.//oz./yd.$^2$ (27.4 gm. cm./cm.$^2$.//gm./m$^2$) and the break elongation about 100%.

By comparison, a similar product is obtained under approximately identical conditions except that an extrusion die with a circular non-undulating orifice is used. Its diameter is 3.0 in. (7.62 cm.), and both the gap width and land length are the same as for the gear die described. The product has approximately 90 pleats which are neither parallel throughout nor uniform in size and shape. Occasionally, two or more pleats converge into one.

Examples 2–41

In addition to the more uniform appearance of the sheets formed using the die of this invention, the tensile properties of the sheet in the transverse direction indicate a more highly perfected structure as seen from Table I and FIGURE 13, which is a plot of the data of Table I.

Examples 2–17 are carried out with a circular, non-undulating sheet-forming orifice having a gap width of 0.010 in. and a land length of 0.062 in. In the remaining examples, except for Example 41 which is carried out with the gear die of Example 1, the gap width of the orifice is varied.

The extruded solutions and extrusion conditions employed in Examples 2–17 and 41 are essentially the same as those employed in Example 1, whereas in Examples 18–40, the solutions and conditions are varied. Under all conditions, however, ultramicrocellular sheets such as are disclosed in Belgian Patent No. 625,829 are prepared. The tensile strength and the elongation at break are measured on 0.5 inch (1.27 cm.) wide strips of each product along the longer, length dimension cut in the transverse sheet direction. The rate of elongation is 50% per minute based on the unstretched sample length.

In each extrusion experiment, three to five measurements of tensile strength and elongation at break are made and averaged. The average tensile strength in the units of lbs./in.//oz./yd.$^2$ is plotted in FIGURE 13 against the average elongation at break for each of the experiments. The filled circles are for sheets made using a die with a circular non-undulating orifice. The open circle represents the sheet product of this example obtained by extrusion through the gear die of FIGURE 2. The gear die is seen to contribute an outstandingly high combination of tensile strength and elongation-at-break as compared with any of the sheets obtained by extrusion through dies with circular orifices.

TABLE I

| Example | Tensile Strength | Elongation at Break |
|---|---|---|
| 2 | 2.20 | 13 |
| 3 | 5.26 | 33 |
| 4 | 1.79 | 93 |
| 5 | 4.51 | 26 |
| 6 | 4.29 | 20 |
| 7 | 4.33 | 19 |
| 8 | 4.33 | 27 |
| 8 | 3.81 | 18 |
| 10 | 3.14 | 23 |
| 11 | 3.05 | 29 |
| 12 | 2.14 | 27 |
| 13 | 2.68 | 90 |
| 14 | 2.97 | 45 |
| 15 | 3.83 | 27 |
| 16 | 3.01 | 31 |
| 17 | 4.45 | 33 |
| 18 | 3.73 | 44 |
| 19 | 1.94 | 97 |
| 20 | 3.86 | 37 |
| 21 | 4.38 | 49 |
| 22 | 4.51 | 31 |
| 23 | 3.44 | 28 |
| 24 | 4.41 | 28 |
| 25 | 2.93 | 25 |
| 26 | 1.89 | 21 |
| 27 | 3.25 | 58 |
| 28 | 3.12 | 16 |
| 29 | 2.98 | 52 |
| 30 | 3.19 | 23 |
| 31 | 2.04 | 12 |
| 32 | 4.58 | 31 |
| 33 | 3.18 | 17 |
| 34 | 4.06 | 32 |
| 35 | 3.37 | 63 |
| 36 | 1.79 | 84 |
| 37 | 2.99 | 31 |
| 38 | 3.14 | 86 |
| 39 | 3.41 | 20 |
| 40 | 2.78 | 44 |
| 41 | 5.2 | 100 |

Example 42

An extruder-mixer is used to prepare a solution of the following components as shown:

| | Parts |
|---|---|
| Polypropylene | 50.0 |
| Fluorotrichloromethane | 44.4 |
| 1,2-dichloro-1,1,2,2-tetrafluoroethane | 5.0 |
| n-Butyl alcohol | 0.5 |

Dispersed in the solution is 0.1 part of silica aerogel. The polypropylene has a melt flow of 0.4 at 230° C. The extruder-mixer has a 2.0 in. (5.08 cm.) diameter screw, a 30.0 in. (76.2 cm.) long extruder section, and a 22.0 in. (55.9 cm.) long mixer section. Into the polymer, which is melted and pressurized by passage through the extruder section, the remaining pre-mixed components are injected and the uniform solution results from passage through the mixer section under conditions selected to discharge the solution at 155° C. and 600 p.s.i.g. (42.3 kg./cm.$^2$ gage).

The solution from the extruder-mixer is discharged into a holding vessel of elongated, cylindrical shape having a hydraulically operated free piston at one end of the solution column and a valve-operated extrusion die at the other end. During filling of the holding vessel and subsequent extrusion, the aforesaid solution temperature and pressure are maintained. On opening the valve, the solution is extruded through the die.

The extrusion die is a gear die of the type illustrated by FIGURES 1 and 2 in which the orifice undulations about the baseline are generally circular in shape. The pitch diameter is 2.0 in. (5.08 cm.), the gap width is 0.005 in. (0.0127 cm.) as a result of the outer radius of 0.0311 in. (0.0790 cm.) and the inner radius of 0.0261 in. (0.0663 cm.), and the land length is 0.100 in. (0.254 cm.). With this geometry, there are 60 undulations or gear teeth in the gear die.

When the above solution is extruded through the gear die, a tubular ultramicrocellular sheet is obtained which, after being slit along the extrusion direction and opened up, is about 8.75 in. (22.22 cm.) wide and has visible on either surface the crests of 60 parallel and uniform pleats. At least a part of all adjacent pleat surfaces within the extruded sheet material are coalesced such that an average transverse force of 0.8 lb./in. (143 gm./cm.) is required to separate the coalesced surfaces. The extruded sheet is about 0.310 in. (0.787 cm.) thick, which is about 5 times thicker than the maximum sheet thickness measured on the same sheet after the coalesced pleat surfaces are separated and the sheet flattened under slight tension.

Although the process as described is a batch process in that first the extruder-mixer is used to fill the holding vessel and then the solution is extruded from the holding vessel, a continuous process readily results when a larger extruder-mixer is used capable of supplying sufficient solution at the elevated temperature and pressure either to continuously replenish the solution in the holding vessel or to extrude directly through a gear die at the exit end of the mixer section of the extruder-mixer.

Example 43

The same extruder-mixer, holding vessel, and gear die of Example 2 are used in another extrusion experiment. The solution charged to the holding vessel has the following components:

| | Parts |
|---|---|
| Polypropylene | 45.0 |
| Fluorotrichloromethane | 48.89 |
| 1,2-dichloro-1,1,2,2-tetrafluoroethane | 5.43 |
| Silica aerogel | 0.272 |
| n-Butyl alcohol | 0.407 |

The polypropylene has a melt flow of 4.0 at 230° C. The solution in the holding vessel is maintained at 140° C. and 800 p.s.i.g. (56.4 kg./cm.² gage).

When the valve to the gear die is opened, the solution is extruded in a downward direction into a region at atmospheric pressure and ambient temperature. The tubular product is passed through pinch rolls located from 5 to 6 feet (1.5 to 1.8 meters) below the die and having rotational velocities such that they draw the tubular product through at a rate substantially the same as the extrusion rate. The pinch rolls flatten the tube and cause solvent vapor to collect within the tube between the pinch rolls and the gear die. When the tubular product reaches its full diameter of approximately 14.75 in. (37.5 cm.), the excess solvent vapor is removed through an opening in the center of the gear die at a rate adjusted to keep the tube fully inflated while preventing splitting. Under the pressure of trapped solvent vapor, the pleats formed near the gear die are stretched out and flattened so that the final ultramicrocellular tube, when slit along the extrusion direction and opened up, is 46.4 in. (117.8 cm.) wide or approximately four times wider than the mean periphery of 11.6 in. (29.5 cm.) of the orifice of the gear die.

The product as it emerges from the pinch rolls is a collapsed tube each sheet layer of which is about 0.040 in. (0.102 cm.) thick. Although no pleats remain in this sheet, its earlier pleated state is clearly evidenced by the existence of 60 visible variations in surface texture across the total width of the sheet in which similar portions of each variation extend throughout the length of the sheet and are parallel. Moreover, the transverse separation between the corresponding points of any two adjacent variations remains substantially the same throughout. When the sheet is observed using transmitted light, variations in light transmission corresponding to the surface texture variations are seen. Finally, the sheet thickness as measured at numerous points across the width of the sheet varies slightly and with the same periodicity as the surface texture variations.

By way of comparison, the product obtained under identical conditions using an extrusion die having a circular non-undulating orifice 2.25 in. (5.71 cm.) in diameter has a total number of visual pleats across the sheet width varying between about 115 and 130. These pleats are not completely parallel throughout the sheet length, and frequently they combine or separate. Thus, this ultramicrocellular sheet has neither the visual perfection nor the structural perfection which results from extrusion through a gear die.

A preferred plastic foam sheet product produced according to this invention is comprised of ultramicrocellular material as described in Belgian Patent No. 625,829 characterized as follows. It is a foam of a thermoplastic, polymeric substance, the cells of which are polyhedral in shape and which, under microscopic examination, strongly resemble the inner bubbles of soap suds. Substantially all of the polymer is in the walls of these cells, each wall being a thin film whose thickness is less than 2 microns. Thicknesses of adjacent cell walls never differ by more than a factor of 3. Furthermore, the polymer in these cell walls is highly crystalline, exhibits uniplanar orientation and has a uniform texture. Essentially all of the cells are closed cells, i.e., are completely enclosed by the defining cell walls. A minor fraction of the cells may, however, have their walls normal to the direction of extrusion ruptured so that two or more cells form short tubes along the direction of extrusion. Conditions of extrusion are preferably selected to minimize the formation of these tubular cells. The apparent density of the extruded ultramicrocellular material is between 0.5 and 0.005 gm./cc. There are at least $10^3$ cells per cubic centimeter of the extruded material. Cell wall thicknesses and transverse cell dimensions are determined by microscopic examination of cross-sections cut from the extruded ultramicrocellular sheet material. Sections from 20 to 60 microns thick may be cut from frozen sample with a razor blade. Large cell (>50 microns in a transverse direction) samples are frozen directly in liquid nitrogen, but samples with smaller cells are preferably imbedded in water containing a detergent, frozen, and then sectioned. For very thin-walled samples (<1 micron), the wall thickness is best measured using an interferometer microscope. A layer of the sample is peeled off by contact with "Scotch-Tape," a pressure sensitive adhesive tape manufactured by Minnesota Mining and Manufacturing Co., freed from the tape by immersion in chloroform, and subsequently placed on the stage of the interferometer microscope for measurement.

The term "uniplanar orientation" can be understood from the following discussion. "Axial," "planar," and "uniplanar" indicate different types of molecular orientation of high polymeric. Axial orientation refers to the perfection with which the molecular chains in a sample are aligned with respect to a given direction, or axis, in the sample. Planar orientation refers to the perfection with which the molecular chains are oriented parallel to a surface of the sample. Conventional, two-way stretched films generally exhibit a degree of planar orientation. Uniplanar orientation is a higher type of polymer orientation in that it refers to the perfection with which some specific crystalline plane (which must include the molecular chain) in each polymer crystallite is aligned parallel to the surface of the sample. These three types of orientation may occur singly or in combinations; e.g., axial orientation. A technique known as electron diffraction may be used to detect uniplanar orientation. The details of this measurement are to be found in Belgian Patent No. 625,829.

The term "uniform texture" signifies that the density, thickness, and molecular orientation of the polymer in a cell wall are substantially uniform over the whole area of the wall when examined at a resolution of about ½ micron. The presence of uniform texture is best ascertained with a combination of two optical tests performed on single cell walls removed from the sample and mounted normal to the optic axis. Thickness and density are measured with an interference microscope in known manner from the displacement of interference fringes. "Substantially uniform" in this test means that the thickness and density do not vary by more than about ±30% across the area of the cell wall. The uniformity of molecular orientation is observed with a polarizing microscope under conditions customarily employed for detecting optical birefringence. For this test, "substantially uniform" means that complete extinction must occur over the whole area of the cell wall. For ultramicrocellular cell walls having an over-all preferred direction of molecular orientation (in addition to the required uniplanar orientation), rotation of the wall in its own plane may be necessary to obtain complete extinction. For ultramicrocellular walls having random molecular orientation, complete extinction will be observed at every position of the sample. In contrast, if a cell wall has numerous patches of directional molecular orientation, and if the directional component of each patch is not oriented exactly parallel to all of the others, it does not possess uniform orientation, cannot cause complete extinction simultaneously over its whole area, and is not ultramicrocellular. Further, any cell walls with lacey or cobweb-like appearance do not, of course, have uniform thickness or orientation over their whole areas, and are readily distinguished from ultramicrocellular material.

The process by which the regularly pleated sheet of ultramicrocellular material is obtained comprises heating a confined mixture of a polymer plus at least one activating liquid to a temperature and pressure at which a homogeneous solution is formed, which temperature is greater than the boiling point of the liquid, and then extruding the solution through the die of this invention. The term "boiling point" as used herein refers to the temperature at which a liquid boils under an external pressure of one atmosphere. This homogeneous solution, either under autogeneous or higher pressure, is extruded abruptly through a sheet-forming die into a region of substantially lower pressure and temperature under such conditions that a very large number of bubble nuclei exist at the extrusion orifice. The conditions selected for extrusion are such that vaporization of the activating liquid, which produces the cellular structure, so rapidly cools the mass to the temperature at which the polymer precipitates that the orientation produced by the rapid extrusion and expansion is frozen (quenched) in the cell walls. Vaporization of the liquid, precipitation of the polymer, formation of the cells, and quenching of the oriented cell walls all occur within a small fraction of a second, i.e., 0.01 second or less.

Characteristic of each activating liquid is a temperature above which adequate self-nucleation of bubbles occurs but below which the rate of nucleation is insufficient to produce the ultramicrocellular material comprising the sheet products extruded through the die of this invention. The preferred temperature of the confined solution to be extruded is frequently lower than the self-nucleation temperature of the activating liquid and another means for creating very rapid nucleation rates must be provided.

One means for obtaining the required high rates of bubble nucleation is the dissolving of a lower boiling additive in the solution. This additive assists nucleation by increasing the "internal pressure" and by lowering the surface tension of the solution. Although any soluble, low-boiling material is suitable, the preferred materials are those which are supercritical at temperatures above the polymer melting point. Useful additives include nitrogen, carbon dioxide, helium, hydrogen, methane, ethane, propane, ethylene, propylene, certain fluorinated and/or chlorinated methanes and ethanes, and equivalents.

An alternative means for inducing rapid bubble nucleation is the addition of a finely-divided, solid, nucleating agent. This type of additive contributes nothing of itself to the pressure on the solution, allows continuous variation of pressure on the solution above its autogenous pressure, and affords excellent control of the rate of nucleation.

Suitable activating liquids for use in this process should have the following characteristics:

(a) the liquid should have a boiling point at least 25° C., and preferably at least 60° C., below the melting point of the polymer used;

(b) the liquid should be substantially unreactive with the polymer during mixing and extrusion;

(c) the liquid should be a solvent for the polymer under the conditions of temperature, concentration, and pressure required by the extrusion process;

(d) the liquid should dissolve less than 1% of the high polymeric material at or below the liquid's boiling point;

(e) the liquid should form a solution which will undergo rapid vaporization upon extrusion, forming a non-gel polymer phase, i.e., a polymer phase containing insufficient residual liquid to plasticize the structure. In these requirements, the process differs from conventional foam-producing techniques. Choice of a suitable activating liquid is, of course, dependent on the particular polymer in question. Among those found especially useful are hydrocarbons and halogenated hydrocarbons, such as methylene chloride, fluorotrichloromethane, hexane, pentane, and ethyl chloride. Alcohols, such as methanol and ethanol, and alcohol-water mixtures are also frequently useful for this purpose.

The polymers suitable for use in this process for providing regularly pleated ultramicrocellular sheet products are synthetic, crystallizable, organic polymers, e.g., polyhydrocarbons such as linear polyethylene, stereo-regular polypropylene or polystyrene; polyethers such as polyformaldehyde; vinyl polymers such as polyvinylidene fluoride; polyamides both aliphatic and aromatic, such as polyhexamethylene adipamide and polymetaphenylene isophthalamide; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate; and equivalents. The polymers must be of at least film-forming molecular weight, i.e., must have an inherent viscosity of at least 0.2 dl./gm. Inherent viscosity is defined as the quotient of the natural logarithm of the relative viscosity and the polymer concentration, 0.5 gm./dl. The relative viscosity is the quotient of the viscosity in any units of the 0.5 gm./dl. solution of polymer and the viscosity in corresponding units of the pure solvent used in forming the solution, both solution and solvent being at the same temperature.

As aforementioned, one of the features of this ultramicrocellular material is the high degree of polymer orientation in the cell walls, which contributes to the outstanding strength of these sheet structures. For this reason it is preferred to use polymers that become substantially stronger upon orientation. Such polymers include, for example, linear polyethylene, polypropylene, nylon, and polyethylene terephthalate.

Common polymer additives such as dyes, pigments, antioxidants, delusterants, antistatic agents, reinforcing particles, adhesion promoters, removable particles, ion exchange materials, ultraviolet stabilizers, and the like may be mixed with the polymer solution prior to extrusion, if desired.

Although the above method of forming ultramicrocellular material is included to facilitate the understanding of this invention, the invention is in no way limited to this method. Thus, the thermoplastic, synthetic-organic polymer to be extruded need not necessarily be either crystalline, crystallizable, or capable of orientation. Preferably, however the extrusion process is characterized by rapid quenching of the foamed product so that its extruded shape can be retained during subsequent collection or wind-up steps. Neither is the expanding agent restricted to the activating liquids described. Normally liquid, normally gaseous, and solid gas-forming expanding agents, as are familiar to those skilled in the art, are likewise applicable.

The expanded size of extruded cellular material at its initial point of full expansion is characterized by three mutually perpendicular linear expansion factors, that is, ratios of dimensions of an element of the fully expanded product to those of the element of expandable solution from which it is formed. One factor, conveniently regarded as the length expansion factor, is the ratio of the dimension of this element along the direction of extrusion when fully expanded to that before passage through the extrusion die. Another, the thickness expansion factor, is a similar ratio measured normal to the surface of the expanded sheet. The third, or transverse expansion factor, is measured everywhere perpendicular to the other two dimensions, that is, transversely along the surface of the fully expanded tubular sheet. The nature of these three expansion factors is such that the volume of fully expanded cellular material produced from a given volume of expandable solution is simply the given volume of expandable solution times the thickness expansion factor times the length expansion factor times the transverse expansion factor. These three linear expansion factors are usually of nearly equal magnitudes, and extrusion processes to which this invention relates are characterized by linear expansion factors in the range of about 2 to 5.

Under the extrusion conditions described, the formation of a pleated tube is inevitable for dies of practical size. As indicated by the above discussion on linear expansion factors, the peripheral length, P, of the extruded sheet, that is, its total transverse dimension measured completely around the extruded tube of fully expanded foam material and on its surface so as to follow exactly along the walls of whatever pleats exist, is given by $$P = \pi DX \quad (1)$$

where X is the transverse linear expansion factor, D is the mean diameter of the circular extrusion orifice, and $\pi D$ is the corresponding mean circumference of that orifice. For most extrusion processes, especially those in which full foam expansion occurs very near the die face, the diameter of the fully expanded tubular structure is constrained to a value less than that which provides a circular circumference equal to the peripheral length, P, which peripheral length must result regardless. To accommodate this situation, the extruded sheet forms longitudinal pleats. The average circumference, C, of the extruded tubular structure at the initial point of full foam expansion is given by $$C = \pi(D + L) \quad (2)$$

in which L is the increase in average diameter of the extruded tubular structure over the average diameter, D, of the circular orifice. This circumference, C, is less than the peripheral length, P, of the extruded sheet which, by pleating along its periphery, has accommodated itself to the decreased circumference of the tubular product.

Combining Equations 1 and 2 yields a mathematical statement of those conditions under which pleats must form, that is, under which P exceeds C.

$$X > 1 + \frac{L}{D} \quad (3)$$

A simple rearrangement of Equation 3 results in Equation 4 which expresses the conditions under which pleat-free sheets can form, that is, when P is less than or equal to C.

$$D \leq \frac{L}{X - 1} \quad (4)$$

Although the derivation of Equations 3 and 4 is based on extrusion through a circular annular orifice as in FIGURE 2, similar considerations apply to other shapes of conventional sheet-forming orifices. In particular, Equations 3 and 4 apply unchanged to extrusion through a straight slot with the exception that D must be interpreted as the slot length and L the increase over D in width of the extruded pleated sheet. Generally, L is defined as the increase in the average transverse dimension of the fully expanded, pleated extruded foam structure over that of the corresponding dimension of the orifice through which the foam structure is formed. For the circular orifice, the average transverse dimension of the extruded foam structure is the average diameter of the extruded tube and the corresponding dimension of the orifice is its diameter, whereas with extrusion through a straight slot, the average transverse dimension is the average width of the extruded sheet and the corresponding dimension of the orifice is the length of the orifice.

Equation 4 above is employed to determined the maximum peripheral length for each undulation of the gear die which is equal to $\pi L/X-1$, where L and X have the significances noted above. The factor L is determined by extruding a particular thermoplastic foamable composition through a conventional sheet-forming orifice and measuring the average transverse dimension of the fully expanded, pleated product, and the dimension of the orifice corresponding to said transverse dimension of the extruded product. The factor L is the difference between these two dimensions. The transverse linear expansion factor X is, for the same product from which L is determined, the ratio of the peripheral length of the product and the corresponding dimension of the orifice through which the product is formed. For example, in extrusion through a circular orifice, the peripheral length of the tubular product is its width after it is slit longitudinally, opened up to a single thickness flat sheet, and tensioned or otherwise treated to flatten all the pleats. This peripheral dimension is denoted P in Equation 1. The corresponding dimension of the circular orifice is its mean circumference. In extrusion through a straight-slot orifice, the peripheral length of the extruded product is its width after all the pleats are flattened by transverse tensioning, and the corresponding dimension of the orifice is simply the length of the straight-slot orifice. Thus, the values X and L are determined by appropriate measurements on a particular pleated foam product extruded through any conventional sheet-forming orifice. Such conventional sheet-forming orifices are well known to those possessing ordinary skill in the art, and include, inter alia, orifices having the baseline shapes shown in FIGURES 4–11, inclusive.

With regard to the extrusion process hereinbefore given in detail in which ultramicrocellular sheets are formed, the expansion and cooling rates are so rapid that L never exceeds 2 cm. and is usually less than or about 1 cm. Since X is characteristically about 3 for this process, it is obvious from Equation 3 that pleats must form unless D is less than about 1 cm., a dimension too small for the production of many commercially desirable sheet products.

These same factors are operative in all sheet-forming, foam-extrusion processes. In general, the number of pleats formed increases with decreasing thickness of the extruded sheet and with increasing extrusion velocity. Baseline shapes other than circles as in FIGURE 4 or straight slots as in FIGURE 6 may be employed. If a polygonal shape with sharp changes in direction is used, the orifice of the gear die constructed about it is preferably designed so that the gap width is everywhere constant.

It is a surprising feature of extrusion processes involving such rapid expansion and uncontrolled stresses that the number of pleats formed throughout the extrusion of a given foamable composition through a given sheet-forming die remains substantially constant. This number is not perfectly constant, however, nor do all pleats have the same size and shape. This is obvious from examination of the surface of a cellular sheet so extruded, and the non-uniformities in size, shape, and parallelism of the pleats impart an appearance of imperfection which persists even if the pleats, once formed, are subsequently flattened by some stretching or pressing process. Periodic variations in thickness, surface texture, and/or optical properties are left acorss the width of the sheet as a result of the earlier pleated stage, and these variations, as they extend along the length, are visibly non-uniform in size and parallelism.

The gear die of this invention maintains perfectly constant the number of pleats formed during extrusion, renders all pleats parallel, and controls the extrusion so that each pleat remains substantially the same size and shape throughout. The flattened sheet also exhibits the same degree of regularity and perfection as regards the variations in thickness, surface texture, and/or optical properties.

The shape of orifice undulations from the baseline in the gear die of this invention need not be circular as shown in FIGURE 1 and 2, although a circular shape is preferred because of its relatively simple fabrication. Thus, sinusoidal elliptical, parabolic, oval, and like smoothly rounded shapes are within the scope of this invention. Nor is it necessary for all undulations or gear teeth in a given gear die to be of the same size and shape. Ordinarily, however, the gear die has gear teeth which are uniform throughout in order to provide the appearance of regularity and perfection to the extruded sheet product. Whatever the shapes or sizes of undulations selected, they must each provide positive control over pleat formation and the elimination of structural irregularities which result, in contrast, from uncontrolled extrusion through ordinary sheet-forming dies.

The size of each undulation is limited and is ordinarily small relative to the length of the baseline. If, for instance, the peripheral length of each undulation (measured along the orifice) is too great, one or more uncontrolled naturally occurring pleats form within the imposed pleat. On the other hand, if the maximum deviation of the orifice from the baseline (the length of inner radius 17) is less than or about the same as the gap width (i.e., the difference between radii 17 and 18), the gear die is ineffective in imposing pleat formation and fails to provide the desired control of number, shape, and size of pleats.

In the extrusion of thermoplastic foam as hereinbefore described in detail, the maximum orifive length for pleat-free extrusion through a circular orifice is about 0.5 in. (1.27 cm.) and more typically about 0.25 in (0.635 cm.). Orifice gap widths should be in the range from about 0.003 to 0.030 in. (0.008 to 0.076 cm.) and preferably from about 0.005 to 0.020 in. (.13 to .05 cm.). The gear die of FIGURE 2 designed for control of pleat formation in this particular process is then characterized by an inner radius 17 greater than about 0.005 in. (0.013 cm.) and less than about 0.08 in. (0.20 cm.). When extrusion of the foaming compositions described is through a gear die constructed within the limits just specified, the resultant thermoplastic foam product has a precisely constant number of pleats all of which remain parallel throughout the length of the extruded sheet and each of which remains substantially the same in size and shape. If, in this process, the extruding tube is gas-inflated to flatten the pleats, then the gear die imparts to the solidified sheet the same regularity in the periodic variations of thickness, surface texture, and/or optical properties.

In addition to providing an appearance of perfection to the extruded celluar sheet, the gear die also provides an improvement in the transverse in-plane tensile and elongation properties of the sheet. During extrusion of a foaming composition through a conventional sheet-forming orifice, the uncontrolled pleat formation frequently results in folding of the sheet at rates which result in both partial and complete local fracture of the walls of the extruding and rapidly expanding tubular structure. These structural imperfections extend along the length of the sheet and limit, often severely, the transverse tensile and elongation properties.

A still further advantage of the gear die is that, under carefully selected conditions, the sheet extruded through it can form pleats which contact each other at adjacent surfaces within the sheet and coalesce so that a much thicker extruded sheet is obtained than results when the pleat surfaces do not coalesce. This type of product is particularly desirable when, as in the case of the detailed extrusion process of this specification, practicable dies may have only very narrow orifices. The cellular sheet with coalesced adjacent pleat surfaces displays only the pleat "creses" on its surface and appears to be comprised of cellular strands or filaments adhered in side-to-side array.

The size of a gear die is theoretically unlimited. In practice, however, the limit will be determined by the capacity of the extruder which feeds foaming compositions to the gear die, by problems of handling and mounting a massive die, or by difficulty in distributing the foaming compositions uniformly to all parts of a very large die.

Thermoplastic foam products obtained according to this invention by extrusion through a gear die are superior to those provided by prior art processes in that the pleats which are imposed by the gear die remain uniform in size and shape throughout the sheet, are parallel to one another and to the extrusion direction, and are constant in number. Moreover, if the pleats are flattened by a stretching or calendering operation, the inevitable variations in thickness, surface texture, and/or optical properties exhibit the same regularity and uniformity. Finally, the cellular sheet from extrusion through a gear die has generally improved transverse tensile and elongation properties. Due to these and other properties, such as increased bulkiness, the products obtainable with the apparatus of this invention find commercial utility as cushioning materials in chairs, car seats, etc., and as insulating materials.

As many widely different embodiments of this invention may be made without departing from the spirit and scope thereof, it is to be understood that this invention is not limited to the specific embodiments thereof except as defined in the appended claims.

What is claimed is:

1. In a process for producing thermoplastic foam by discharging a foamable, synthetic polymer composition through a sheet-forming extrusion die to give three-dimensional expansion of the polymer and thus tend to create a pleated sheet, the improvement for causing said pleats to occur in a regular sequence across said sheet which comprises extruding said foamable, synthetic polymer composition through said die, the orifice of which has an essentially constant gap width and which makes undulations about a baseline which has the shape of a conventional sheet-forming orifice, each of said undulations having a maximum displacement from the baseline in excess of the gap width of the orifice, the peripheral length of each said undulation being less than $\pi L/X - 1$, wherein X is the transverse linear expansion factor of said thermoplastic foam extruded through a conventional sheet-forming orifice, L is equal to the difference between the average transverse dimension of said thermoplastic foam extruded through a conventional sheet-forming orifice and the corresponding dimension of the said conventional sheet-forming orifice, and $\pi$ is the universal constant 3.1416.

2. In a process for producing a pleated ultra-microcellular sheet structure by discharging a solution of a synthetic-organic crystallizable polymer of film-forming molecular weight in an activating liquid through a sheet-forming extrusion die to give three-dimensional expansion of the polymer and thus tend to create a pleated ultra-microcellular sheet, the improvement for causing said pleats to occur in a regular sequence across said sheet which comprises extruding said solution through said die, the orifice of which has an essentially constant gap width and which makes undulations about a baseline which has the shape of a conventional sheet-forming orifice, each of said undulations having a maximum displacement from the baseline in excess of the gap width of the orifice, the peripheral length of each said undulation being less than $\pi L/X-1$, wherein X is the transverse linear expansion factor of said thermoplastic foam extruded through a conventional sheet-forming orifice, L is equal to the difference between the average transverse dimension of said thermoplastic foam extruded through a conventional sheet-forming orifice and the corresponding dimension of the said conventional sheet-forming orifice, and $\pi$ is the universal constant 3.1416.

3. In an apparatus for the production of thermoplastic foams comprising a sheet-forming extrusion die and means for supplying a foamable synthetic polymer composition thereto, the improvement wherein said die has an orifice of an essentially constant gap width and which makes undulations about a baseline which has the shape of a conventional sheet-forming orifice, each of said undulations having a maximum displacement from the baseline in excess of the gap width of the orifice, the peripheral length of each said undulation being less than $$\frac{\pi L}{X-1}$$

wherein X is the transverse linear expansion factor of said thermoplastic foam extruded through a conventional sheet-forming orifice, L is equal to the difference between the average transverse dimension of said thermoplastic foam extruded through a conventional sheet-forming orifice and the corresponding dimension of the said conventional sheet-forming orifice, and $\pi$ is the universal constant 3.1416.

4. In an apparatus for the production of thermoplastic foams comprising a sheet-forming extrusion die and means for supplying a foamable synthetic polymer composition thereto, the improvement wherein said die has an orifice of an essentially constant gap width and which makes undulations about a baseline which has the shape of a circle, each of said undulations having a maximum displacement from the baseline in excess of the gap width of the orifice, the peripheral length of each said undulation being less than $$\frac{\pi L}{X-1}$$

wherein X is the transverse linear expansion factor of said thermoplastic foam extruded through a conventional sheet-forming orifice, L is equal to the difference between the average transverse dimension of said thermoplastic foam extruded through a conventional sheet-forming orifice and the corresponding dimension of the said conventional sheet-forming orifice, and $\pi$ is the universal constant 3.1416.

5. The apparatus of claim 4 wherein each of said undulations is circular in shape.

6. The apparatus of claim 4 wherein the peripheral length of each said undulations is less than about 1 centimeter.

7. The apparatus of claim 4 wherein each of said undulations is circular in shape and has a peripheral length of less than about 1 centimeter.

8. In an apparatus for the production of thermoplastic foams comprising a sheet-forming extrusion die and means for supplying a foamable synthetic polymer composition thereto, the improvement wherein said die has an orifice of an essentially constant gap width and which makes undulations about a baseline which has the shape of a straight line, each of said undulations having a maximum displacement from the baseline in excess of the gap width of the orifice, the peripheral length of each said undulation being less than $$\frac{\pi L}{X-1}$$

wherein L is the increase in the width of the extruded foam over the length of said orifice, X is the transverse linear expansion factor of the foam, and $\pi$ is the universal constant 3.1416.

9. The apparatus of claim 8 wherein said undulations are circular in shape.

10. The apparatus of claim 8 wherein each of said undulations is circular in shape and has a peripheral length of less than about 1 centimeter.

References Cited

UNITED STATES PATENTS

| 2,423,260 | 7/1947 | Slaughter | 264—209 XR |
| 3,080,614 | 3/1963 | Adams | 264—177 XR |
| 3,227,784 | 1/1966 | Blades et al. | 264—176 XR |
| 3,277,221 | 10/1966 | Parrish | 264—53 |
| 3,327,031 | 6/1967 | Boyer et al. | 264—53 |

FOREIGN PATENTS

| 31,843 | 6/1885 | Germany. |
| 1,342,825 | 10/1963 | France. |

OTHER REFERENCES

Collins, F. H. Controlled Density Polystyrene Foam Extrusion." In SPE Journal July 1960, pp. 705–709. Copy in 264–53.

JULIUS FIOME, *Primary Examiner.*

PHILIP E. ANDERSON, *Assistant Examiner.*